United States Patent [19]

Montaner et al.

[11] Patent Number: 5,025,958

[45] Date of Patent: Jun. 25, 1991

[54] SPRAY PUMP

[75] Inventors: Pedro P. Montaner, Esplugues De Llobregat; Victor R. Turró, Barcelona, both of Spain

[73] Assignee: Monturas, S.A., Barcelona, Spain

[21] Appl. No.: 611,077

[22] Filed: Nov. 9, 1990

[30] Foreign Application Priority Data

Apr. 26, 1990 [ES] Spain .................................. 9001196

[51] Int. Cl.[5] .............................................. G01F 11/36

[52] U.S. Cl. .................................... 222/321; 417/552; 222/385

[58] Field of Search ............... 417/511, 513, 514, 549, 417/552; 222/321, 341, 385; 239/333

[56] References Cited

U.S. PATENT DOCUMENTS

| | | | |
|---|---|---|---|
| 3,500,761 | 3/1970 | Clevenger et al. | 417/513 |
| 4,082,222 | 4/1978 | Boris | 222/321 |
| 4,189,064 | 2/1980 | O'Neil et al. | 222/321 |
| 4,941,595 | 7/1990 | Montaner et al. | 222/321 |

*Primary Examiner*—Leonard E. Smith
*Assistant Examiner*—Charles G. Freay
*Attorney, Agent, or Firm*—Staas & Halsey

[57] ABSTRACT

The pump comprises: a main cylinder (24); a main plunger (12) urged by a first spring (62) and extended by a hollow stem (10) and having a valve seat therein; a secondary cylinder (52) comprised within the main cylinder (24); a secondary plunger (64) urged by a second spring (70) having an upper extension (66) and being provided with a cavity (72) which is closed in the proximity of the end (68) engageable with the valve seat; while it is open at the lower end thereof, maintaining communication with the space (54).

1 Claim, 1 Drawing Sheet

SPRAY PUMP

BACKGROUND OF THE INVENTION

The invention relates to a spray pump of the type comprising: a main cylinder in which a pumping chamber is defined; a main plunger slidingly mounted within said main cylinder between a first rest position and a second end-of-stroke position, said plunger being extending by a hollow stem and having a valve seat therein; first resilient means urging said plunger to said first position; a secondary cylinder comprised within said main cylinder; a secondary plunger slidingly mounted in said secondary cylinder between a first closed position and a second open position, said secondary plunger having an upper extension with one end engageable with said valve seat; and second resilient means urging said secondary plunger to said first position, said main plunger being fixedly attached to said secondary cylinder, which determines a space having a closed bottom end and an upper open mouth, through which the pumping chamber and the said space are in communication.

On many occassions during daily life it is necessary to spray liquids of widely varying viscosities onto different surfaces or in different spaces. This need arises, for example, during personal toilet operations for spraying lotions, toilet waters, deodorants or other products on the human body, as well as in domestic cleaning, or for spraying insecticides, air sweeteners, etc.

On such occassions, it is desirable to achieve a powerful spray, not being weak at the start or finish thereof, since otherwise, the spray is preceded by and/or terminated with a weak jet that does not attain the desired objective and is, therefore, wasted and may even cause undesired effects, such as stains, dripping, etc.

Pumps forming a precompression of the product to be dispensed are known and the purpose of such precompression is to allow the vigorous spray mentioned above.

Some of these known pumps have a single spring or resilient means fulfilling two missions, i.e. causing the plunger to return to the starting position once the pump has been operated and providing the desired precompression. These pumps, therefore, have the drawback of not being able separately to control the recovery speed or conditions and the degree of precompression.

In another type of known pumps, of the type described at the beginning, the operation is based on a predetermined relationship between the power of the two resilient means they have, such that one of the springs may not be modified alone, without substantially modifying the operation of the pump or even preventing it from operating.

In these known pumps, since there is no possibility of changing the corresponding springs or resilient means freely and independently, there is a restriction of their field of action, obliging different pumps to be manufactured for different applications, thereby precluding the manufacture of long runs, with the logical adverse effect on costs.

A third group of pumps may be cited which have two springs which may be independently replaced. Nevertheless, these other know pumps suffer from various drawbacks, such as the drawbacks relating to a premature, albeit limited communication of the pumping chamber with the exterior.

In U.S. patent application Ser. No. 07/393.874, commonly assigned, the above drawbacks were overcome, while retaining at all times the advantages derived from the precompression of the product to be dispensed.

The above application did not contemplate any condition concerning the shape of the secondary plunger, whereby it comprises any embodiment thereof.

Nevertheless said secondary plunger was seen in the drawings to have axial cavity, open at both ends, extending along the whole length of the plunger and this feature is claimed in a dependant claim. Furthermore, an embodiment in which said plunger is solid is contemplated.

New research has shown that the fact that the said cavity is open at both ends limits the advantages of the invention as described in said applications, since at the lower portion of the secondary plunger there acts the backpressure generated as a result of the restriction created by the diffusor and the insert, which backpressure is communicated through the plunger cavity and counteracts the inner pressure, which acts to separate the end of the secondary plunger from the valve seat situated within the main plunger. All of this leads to a situation tending to balance the pressures, as a result of which the the pump operation may become difficult and the spraying deficient.

SUMMARY OF THE INVENTION

These limitations are overcome with the spray pump of the invention, which is characterised in that said secondary plunger is provided with a cavity closed in the proximity of the end engaging the valve seat, while it is open at the lower end thereof, maintaining communication with said space.

BRIEF DESCRIPTION OF THE DRAWINGS

Further advantages and features of the invention will be appreciated from the following description in which, without any limiting intention there is described one preferred embodiment of the invention, with reference to the accompanying drawings, in which.

DETAILED DESCRIPTION OF THE INVENTION

Figure 1:
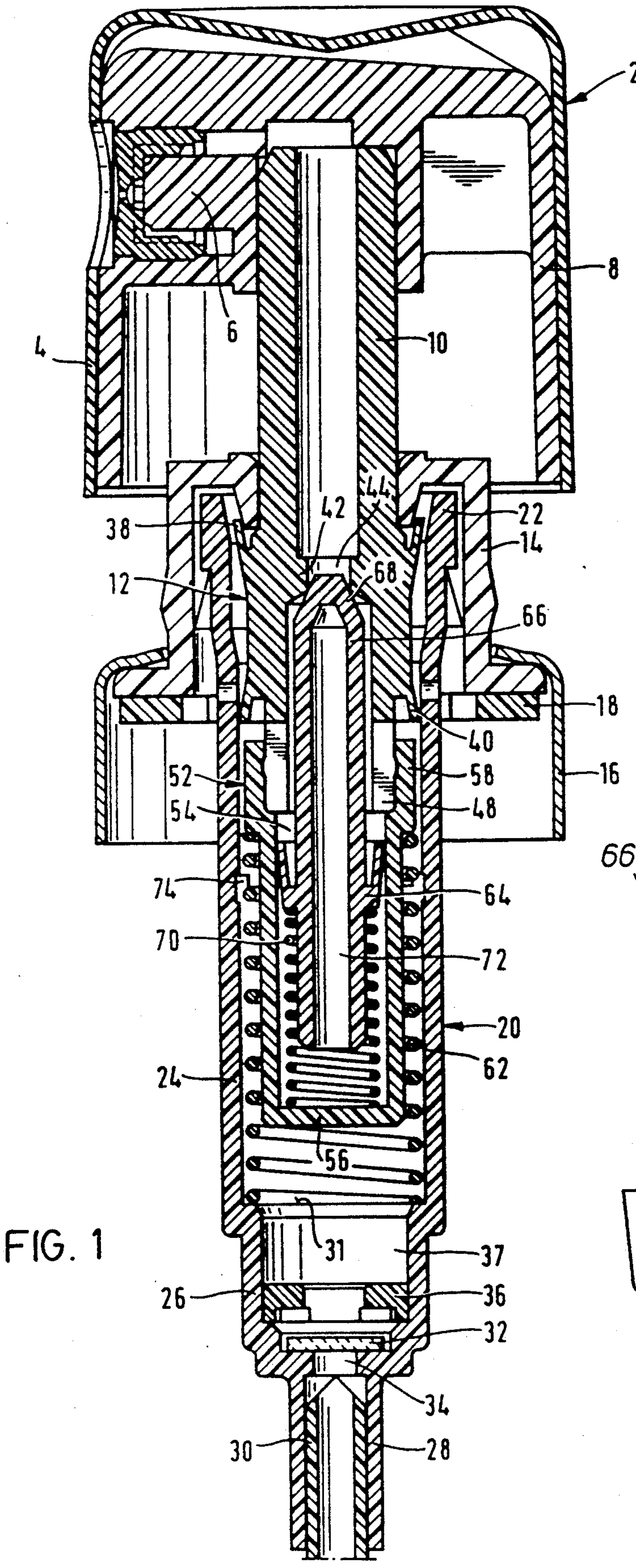
FIG. 1 is an axial cross section view of a spray pump in the rest position of the main plunger.
Figure 2:
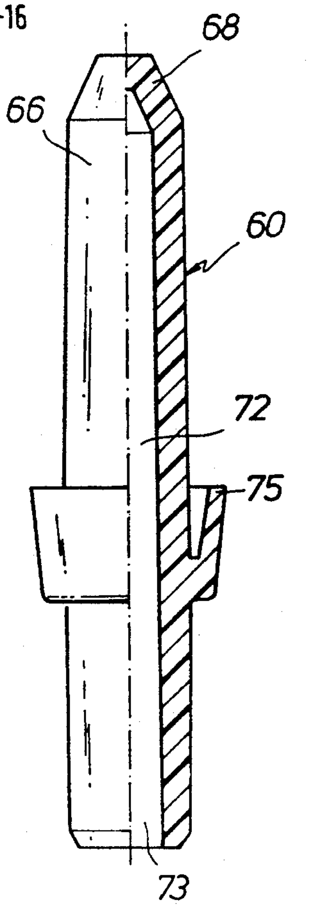
FIG. 2 is an elevation view, partly in section, of the secondary plunger, on a larger scale.

The pump comprises diffusion and operating means 2 which are not described in detail because they are conventional and such description is not required for an understanding of the invention. Said means 2 include a cap 4, a diffusor 6 and means 8 for coupling the assembly to the rest of the pump, particularly to the stem 10 of the main plunger 12, to be referred hereinafter.

A body 14 and a cap 16 allow the pump to be attached to the container, not shown, in which the material to be sprayed in contained. A gasket 18 of appropriate material allows a tight seal between the parts.

Supported by the said body 14 there is a shell member 20 formed by a wide upper portion 22, by a main cylinder 24 having a smaller diameter lower portion 26 and by a portion 28 for attachment to a dip tube 30, shown in part and which places the pump in communication with the bottom of the said container. There is an annular shoulder 31 between the cylinder 24 and the portion 26.

In the lower portion 26 there is a stopper member which, in the exemplified embodiment, is a moving disc 32 for closing an orifice 34. A perforated cover 36 limits the range of movement of the disc 32 so that the latter may be in a position to act as a stopper when required.

The cylinder 24 and part of the lower portion 26 define a pumping chamber 37 and the main plunger 12 slides along the cylinder 24. The plunger is provided with an upper lip 38 and a lower lip 40 which bear against the inner surface of the cylinder 24. The plunger 12 is generally tubular and is provided with a transverse wall 42 having an orifice 44 in which a valve seat is formed. As stated above, the main plunger 12 is extended at the top end thereof by a hollow stem 10 placing the diffusor 6 in communication with the pumping chamber 37 and said main plunger may slide between a rest position (FIG. 1) and an end-of-stroke position to be mentioned hereinafter.

The main plunger 12 is provided with a logitudinal widened portion 48 extending from the lower end of said plunger and said widened portion 48 is provided with apertures to be described hereinafter. Said longitudinal widened portion is formed by longitudinal strips separated completely from one another by the corresponding apertures (not shown). Nevertheless, the invention includes other embodiments, not shown, which fulfil the purpose which, as said above, is to be described hereinafter.

The pump is also provided with a secondary cylinder 52 which is comprised within main cylinder 24. The secondary cylinder 52 determines a space 54 having a closed bottom end 56 and an upper mouth, preferably defined by a widened portion or pan 58 of the secondary cylinder 52. This widened portion 58 snugly fits around an end portion of the longitudinal widened portion 48, whereby the main plunger 12 is fixedly attached to the secondary cylinder 52, whereby the movement of the plunger 12 causes the movement of the cylinder 52 and vice versa. To facilitate said fixed attachment, first inner annular means are comtemplated in the widened portion 58, mating with second outer annular means on the longitudinal widened portion 48, both being mutually engageable.

It should be noted that when these two members are mutually engaged, they do not close the apertures completely, but the part of the apertures closet to the lower lip 40 remains open. Consequently there is communication between the pumping chamber 37 and said space 54. The embodiment shown is merely one example, since the plunger 12 and secondary cylinder 52 may be fixedly attached together in any other way ensuring at the same time communication between the pumping chamber 37 and the space 54.

First resilient means 62, preferably in the form of a helical spring, urge the main plunger 12 towards the first, rest position thereof. In the example shown, the helical spring extends between the annular shoulder 31 and the start of the widened portion 58 of the secondary cylinder.

There is also a secondary plunger 64 adapted to slide within said secondary cylinder 52, between a first, closed position and a second, open position. The secondary plunger 64 is provided with an upper extensions 66 having a free end 68 engaging the valve seat, in which case it stoppers the orifice 44. Second resilient means 70 urge the secondary plunger to the first, closed position thereof. To this end, they bear against the bottom 56 and the secondary plunger 64 itself.

According to the invention, the secondary plunger 64 is provided with an axial cavity 72, closed at the top end 68 and open at the bottom end 73. This cavity 72 ensures an air cushion, the utility of which is explained hereinafter.

In case of misoperation or deterioration of the lip 75 of the plunger 64, a leak would occur allowing the liqid to enter in the space 54 between the secondary plunger 64 and the secondary cylinder 52, even to the extent of filling such space. Nevertheless, with the cavity being closed, the air remaining therein is sufficient to be compressed, allowing the secondady plunger 64 to be moved sufficiently, separating the end 68 thereof from the valve seat, whereby the orifice 44 ceases to be closed to allow the pumped liquid through.

The main cylinder 24 is provided internally with small cells 74 which are reached by the lower lip 40 of the main plunger when this reaches the second position thereof. In this way, a circuit is formed for expelling the air during the priming of the pump. There are other orifices and passages in the pump to make the air flow towards the interior of the container possible, to replace the volume of liquid removed each time. Nevertheless, said elements are not described since they are not directly connected with the invention.

The pump operates as described in U.S. patent application Ser. No. 07/393.874, incorporated herein by reference.

What we claim is:

1. In a spray pump of the type comprising: a main cylinder in which a pumping chamber is defined; a main plunger slidingly mounted within said main cylinder between a first rest position and a second end-of-stroke position, said plunger being extended by a hollow stem and having a valve seat therein; first resilient means urging said plunger to said first position; a secondary cylinder comprised within said main cylinder; a secondary plunger slidingly mounted in said secondary cylinder between a first closed position and a second open position, said secondary plunger having an upper extension with one end engageable with said valve seat; and second resilient means urging said secondary plunger to said first position, said main plunger being fixedly attached to said secondary cylinder determining a space having a closed bottom end and an upper open mouth, through which the pumping chamber and the said space are in communication, the improvement wherein said secondary plunger is provided with a cavity closed in the proximity of the end engaging the valve seat, while it is open at the lower end thereof, maintaining communication with said space.

* * * * *